(12) United States Patent
Shropshire

(10) Patent No.: US 12,241,268 B2
(45) Date of Patent: Mar. 4, 2025

(54) POLE CRADLE

(71) Applicant: MADI, LLC, Greenville, SC (US)

(72) Inventor: Aaron Shropshire, Hedgesville, WV (US)

(73) Assignee: MADI, LLC, Greenville, SC (US)

( * ) Notice: Subject to any disclaimer, the term of this patent is extended or adjusted under 35 U.S.C. 154(b) by 0 days.

(21) Appl. No.: 18/611,983

(22) Filed: Mar. 21, 2024

(65) Prior Publication Data

US 2024/0229496 A1 Jul. 11, 2024

Related U.S. Application Data

(63) Continuation of application No. 17/460,527, filed on Aug. 30, 2021, now Pat. No. 11,965,349.

(60) Provisional application No. 63/077,028, filed on Sep. 11, 2020.

(51) Int. Cl.
 *E04H 12/34* (2006.01)
 *B60S 9/02* (2006.01)

(52) U.S. Cl.
 CPC ............... *E04H 12/34* (2013.01); *B60S 9/02* (2013.01)

(58) Field of Classification Search
 CPC .................................. E04H 12/34; B60S 9/02
 See application file for complete search history.

(56) References Cited

U.S. PATENT DOCUMENTS

| | | | |
|---|---|---|---|
| 1,234,567 A | 5/1891 | Anderson | |
| 1,371,263 A | 3/1921 | Reed | |
| 2,673,636 A * | 3/1954 | Vermette | B25H 1/00 |
| | | | 248/163.1 |
| 2,841,352 A | 4/1954 | Pappas | |
| 4,819,296 A | 4/1989 | Wilkins | |
| 5,322,250 A | 6/1994 | Wilhte, Jr. | |
| 5,746,406 A * | 5/1998 | Dicke | F16M 11/16 |
| | | | 248/513 |
| 5,788,193 A | 8/1998 | Hilbert | |
| 6,186,449 B1 | 2/2001 | Chrestenson | |
| 6,488,252 B1 | 12/2002 | Ibrahim | |
| 6,505,429 B2 | 1/2003 | Percival | |
| 7,314,207 B2 | 1/2008 | Jones | |
| 7,434,771 B1 | 10/2008 | Tai | |
| 8,444,097 B2 | 5/2013 | Morrow | |
| 8,888,057 B2 | 11/2014 | Morrow | |
| 9,220,339 B1 * | 12/2015 | Chen | A63B 47/00 |
| 11,993,945 B1 * | 5/2024 | Buhr | F16M 11/38 |
| 2022/0034447 A1 * | 2/2022 | Kaiser | F16M 11/242 |

* cited by examiner

*Primary Examiner* — Anita M King
(74) *Attorney, Agent, or Firm* — Shumaker, Loop & Kendrick, LLP; Brandon C. Trego

(57) ABSTRACT

A pole cradle is disclosed. The pole cradle including a first leg; a second leg; a third leg positioned between and pivotally connected to the first and second legs by a pivot connector extending through the first, second, and third legs, wherein the third leg pivots relative to the first and second legs between a first position and a second position; and a support connector extending between the first and second legs, the support connector providing a stop for the third leg such that in the second position, the third leg abuts against the support connector.

14 Claims, 8 Drawing Sheets

POLE CRADLE

BACKGROUND OF THE INVENTION

This invention relates generally to a tool, and more particularly to a utility pole cradle for use by utility workers.

Utility poles are big, heavy and often times need replaced. Often times, in installing utility poles, the poles are dropped into the ground to a depth sufficient to support the utility pole for many years and then the poles are framed. This framing takes place at an elevated height. Usually, a utility truck with a boom or bucket is used to place utility workers at the elevated height so they can frame and finish the connections to the pole.

Unfortunately, framing a utility pole at height can create a dangerous situation. For example, utility workers may drop tools to the ground, creating a hazard for those workers below. Additionally, the utility truck may not be on the most stable ground, creating a hazard where the truck could tilt when the boom or bucket is extended.

Accordingly, there is a need for a pole cradle that allows utility workers to frame a utility pole on the ground and provides a stiff leg pad for the utility truck to provide a stable surface.

BRIEF SUMMARY OF THE INVENTION

This need is addressed by the present invention, which provides a pole cradle capable of supporting a utility pole or alternatively providing a stiff leg pad for a utility truck.

According to an aspect of the invention, a pole cradle includes a first leg; a second leg; a third leg positioned between and pivotally connected to the first and second legs by a pivot connector extending through the first, second, and third legs, wherein the third leg pivots relative to the first and second legs between a first position and a second position; and a support connector extending between the first and second legs, the support connector providing a stop for the third leg such that in the second position, the third leg abuts against the support connector.

According to another aspect of the invention, a pole cradle includes a first leg; a second leg; a third leg positioned between and pivotally connected to the first and second legs, wherein the third leg pivots relative to the first and second legs between a first position and a second position; and wherein each of the first, second, and third legs include a chamfered end to provide a flat support surface when in the second position.

According to another aspect of the invention, a pole cradle includes first and second spaced-apart legs; a third leg positioned between and pivotally connected to the first and second spaced-apart legs, wherein the third leg pivots relative to the first and second legs between a first position and a second position; a stop connected to at least one of the first and second legs, the third leg abutting against the stop in the second position.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
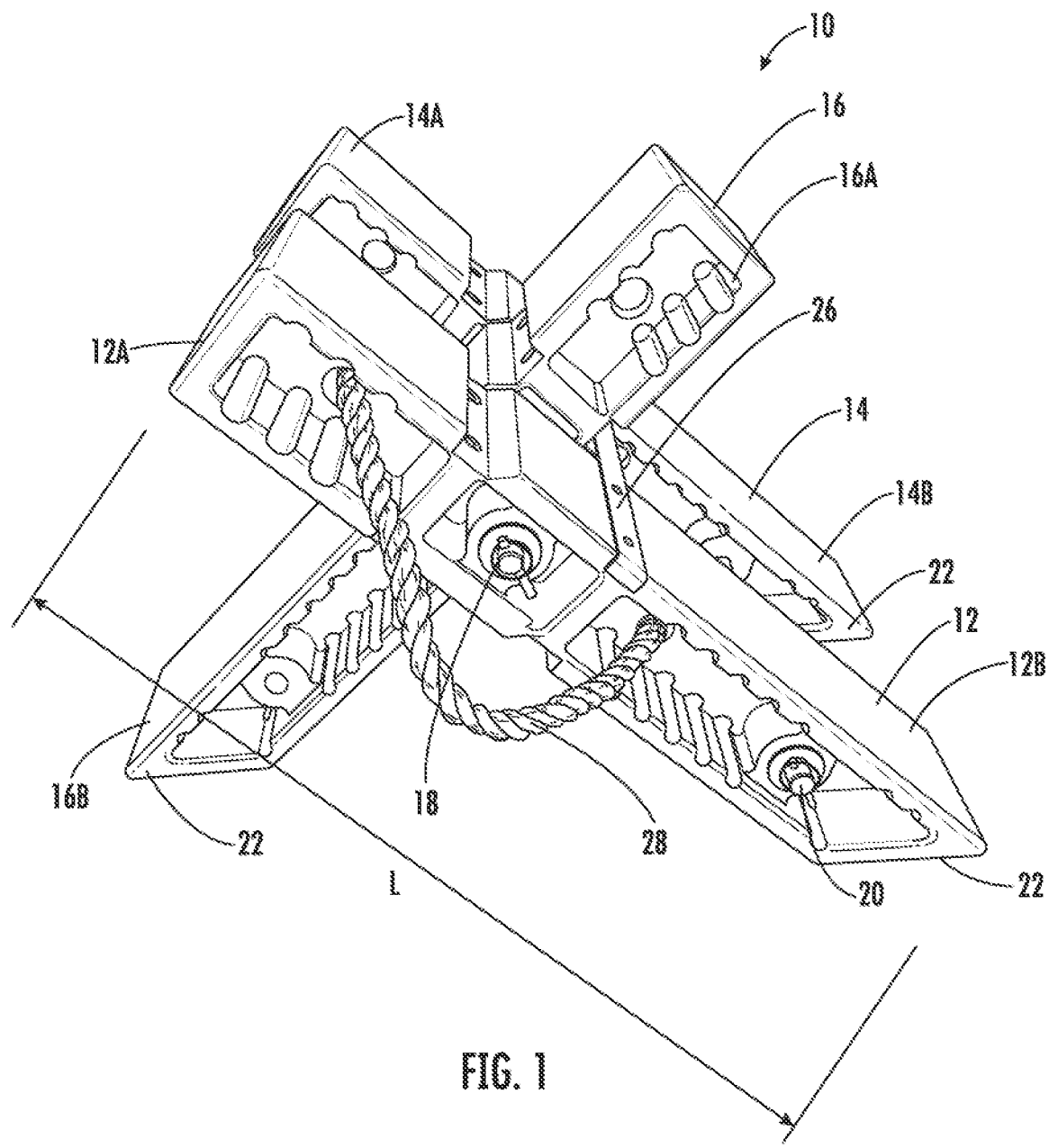
FIG. 1 is a perspective view of a pole cradle according to an embodiment of the invention.
Figure 2:
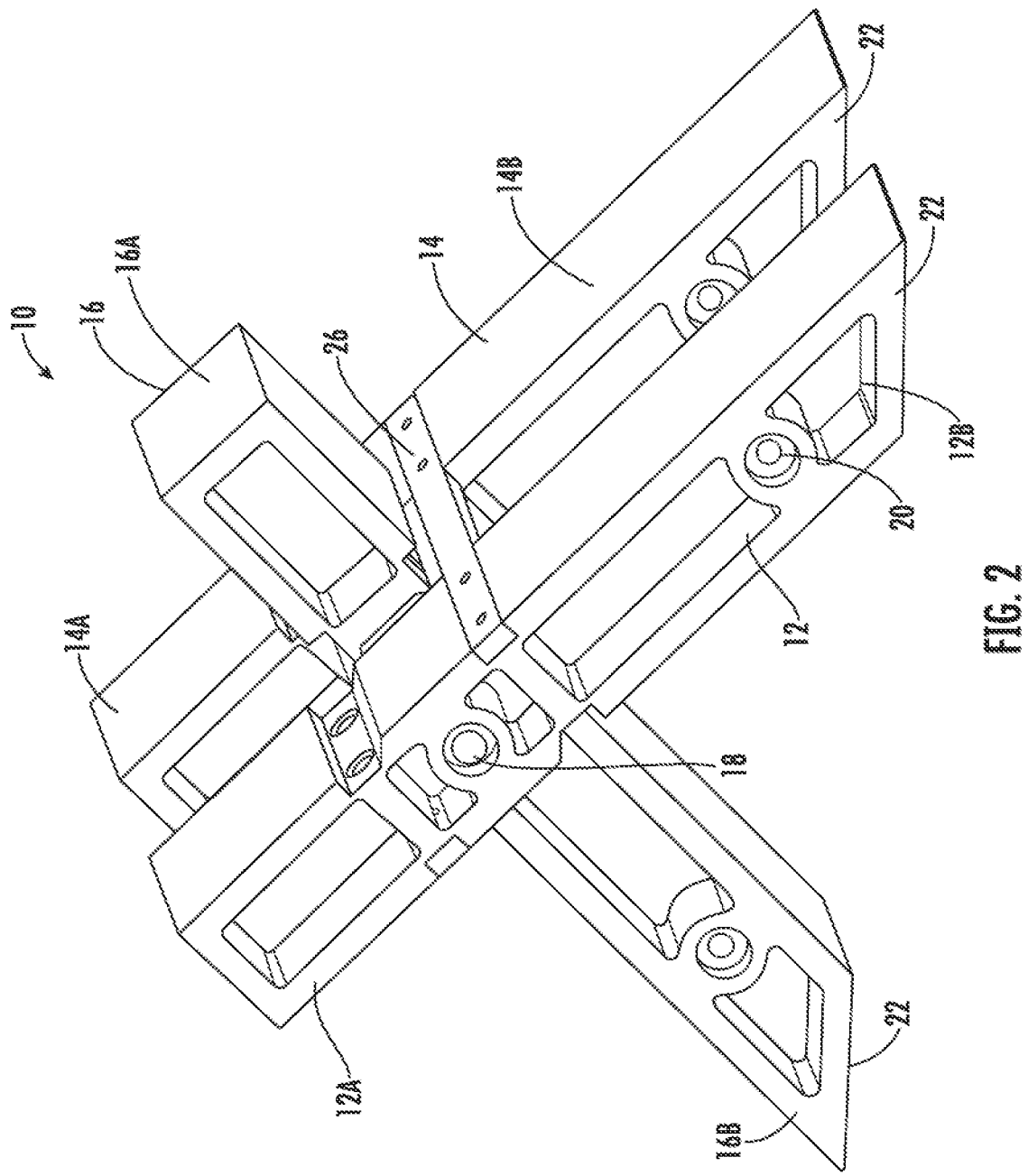
FIG. 2 is a perspective view of the pole cradle of FIG. 1.
Figure 3:
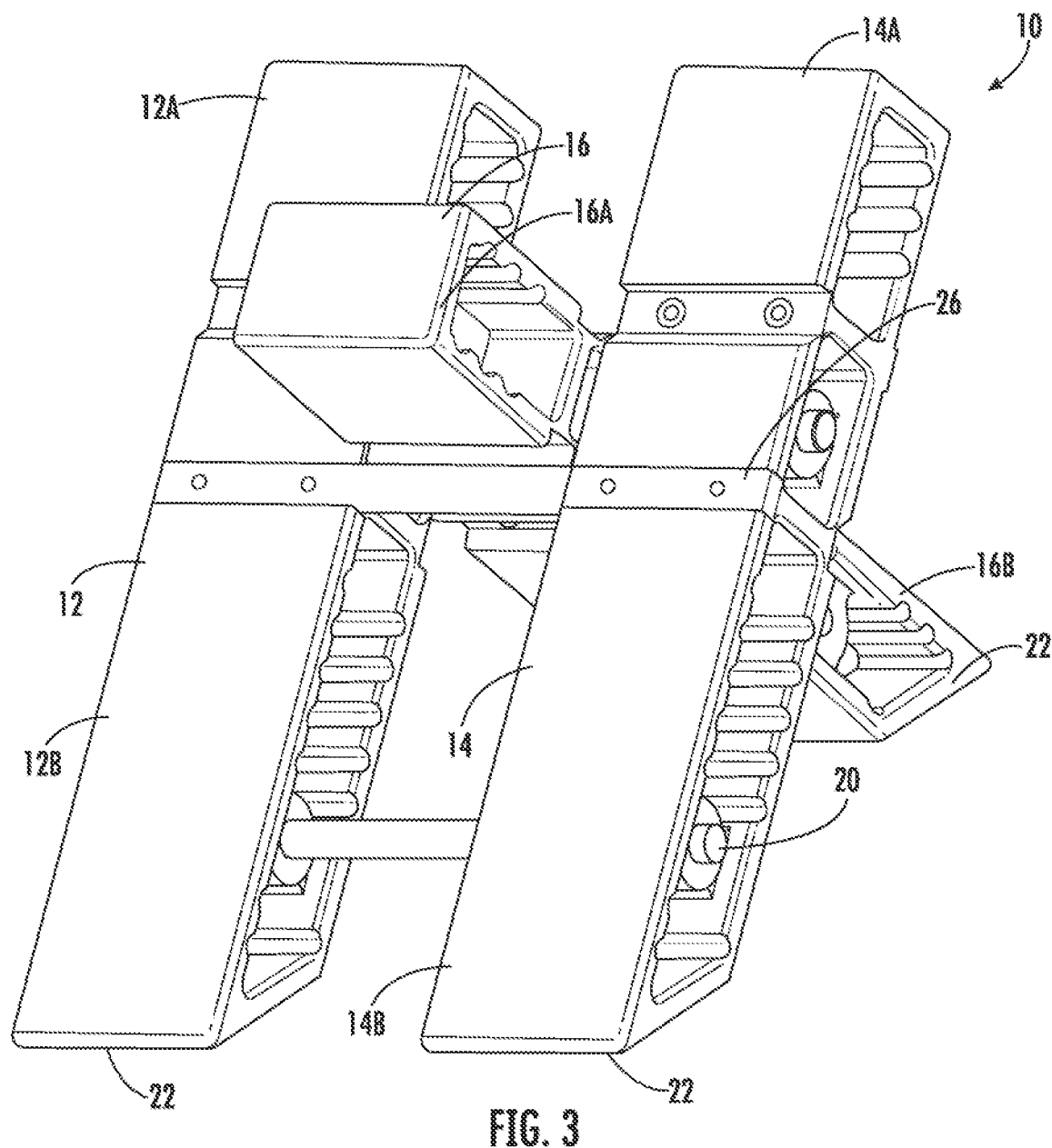
FIG. 3 is a perspective view of the pole cradle of FIG. 1.
Figure 4:
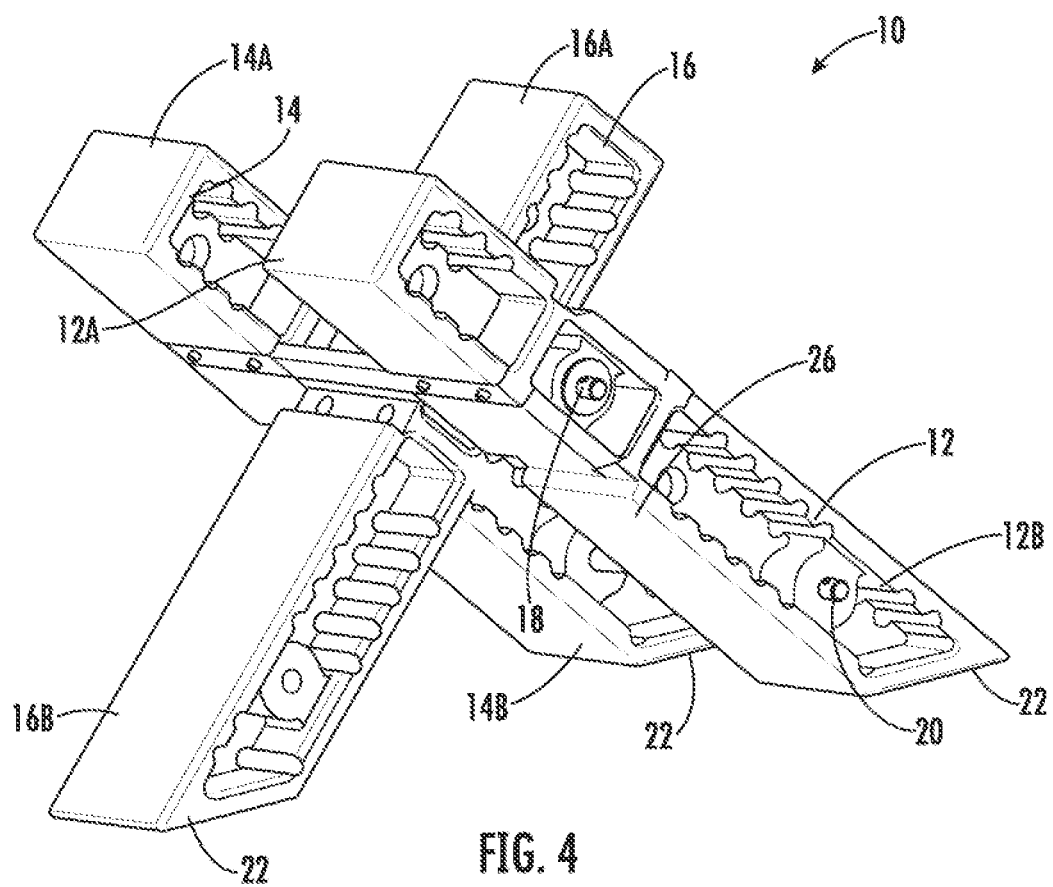
FIG. 4 is a perspective view of the pole cradle of FIG. 1.

Referring to the drawings wherein identical reference numerals denote the same elements throughout the various views, FIGS. 1-4 illustrate a pole cradle 10 in a use position for supporting a utility pole used in power transmission applications. While the below discussion is focused on power transmission applications, it should be appreciated that the pole cradle 10 may be used to support other poles and/or structures and is not limited to just utility poles. As shown, in the use position, the pole cradle 10 has an x-shaped profile and may be made of a suitable material, for example, fiberglass reinforced nylon for weight reduction and durability.

The pole cradle 10 includes a first exterior leg 12, a second exterior leg 14, and an interior leg 16 positioned between and pivotally connected to the first and second exterior legs 12, 14 by a pin, connector, and/or fastener 18 extending through all three legs 12, 14, and 16 at a location between one-half a length "L" and about three-quarter the length "L" of the legs 12, 14, 16 to create upper and lower support portions 12A, 14A, 16A and 12B, 14B, 16B respectively. The lower support portions 12B, 14B, 16B supporting the pole cradle on the ground and the upper support portions 12A, 14A, 16A supporting a pole or structure. A spring pin 20 is also provided to secure the interior leg 16 in a stored position, see FIG. 6, so that the pole cradle 10 lays flat. The pole cradle 10 may also include a carry strap 28.

Each of the legs 12, 14, 16 includes a chamfered end 22 for providing a flat support surface 24 when the pole cradle 10 is in a use position. The chamfered ends 22 are formed at about forty-five degrees with respect to the length "L" of each leg 12, 14, 16. It should be appreciated that other chamfer angles may be used to alter the x-shaped profile. In other words, changing the chamfer angle will change the angle at which the legs 12, 14, 16 extend upwardly from the ground (taller x-shape or fatter x-shape).

A support bar, stop, and/or connector 26 extends between the first exterior leg 12 and the second exterior leg 14. The support bar 26 connects the first and second exterior legs 12, 14 together and provides a stop for the interior leg 16. As shown, when the pole cradle 10 is moved to a use position, the interior leg 16 extends in a direction opposite the first and second exterior legs 12, 14 and abuts against the support bar 26. The support bar 26 prevents the interior leg 16 from rotating with respect to the first and second exterior legs 12, 14 beyond the desired x-shaped used position, thereby maintaining the pole cradle 10 in the x-shape when a utility pole is positioned thereon, see FIG. 5. It should be appreciated that the support bar 26 may be connected to or integrally formed with one or both of the first and second legs.

Figure 5:
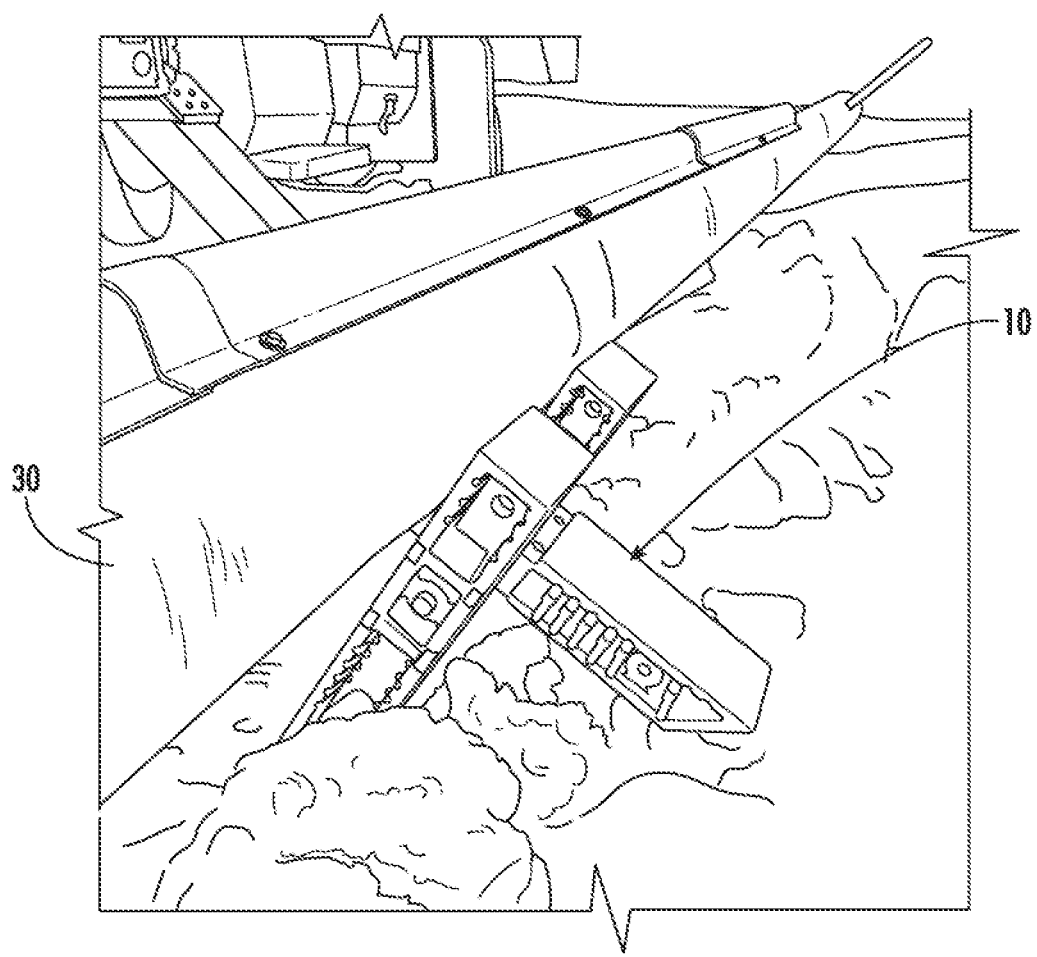
FIG. 5 shows the pole cradle of FIG. 1 supporting a utility pole.

As illustrated in FIG. 5, a utility pole 30 is supported between the upper support portions 12A, 14A, 16A of the legs 12, 14, 16. The lower support portions 12B, 14B, 16B engage the ground and provide support to the pole cradle 10 and utility pole 30. As shown, in FIGS. 1-4, the upper support portions 12A, 14A, 16A form a V-shaped receiving section to cradle and or lock the utility pole 30 therebetween.

Figure 6:
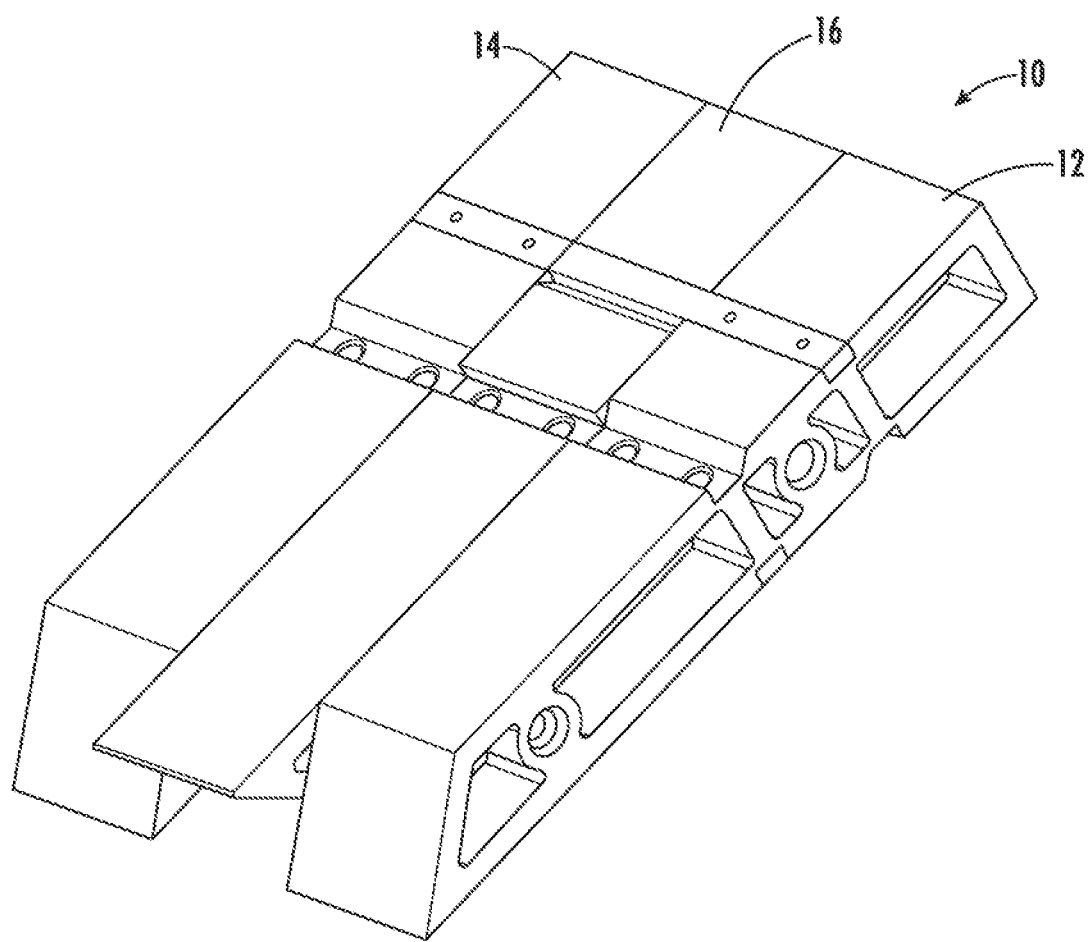
FIG. 6 shows the pole cradle of FIG. 1 in a stored position.

Referring to FIG. 6, the pole cradle 10 may be moved from the use position, FIGS. 1-5, to a stored position. This is done by rotating the interior leg 16 with respect to legs 12 and 14 until the interior leg 16 lies in plane with the first and second exterior legs 12, 14. Once the interior leg 16 is rotated, spring pin 20 is used to lock the interior leg 16 with first and second exterior legs 12, 14 in a flat stored position. The spring pin 20 being spring-loaded such that the pin 20 snaps into a locked position when the interior leg 16 is in plane with the first and second exterior legs 12, 14. To release the interior leg 16, the pin 20 is pulled outwardly until the interior leg 16 is released.

Figure 7:
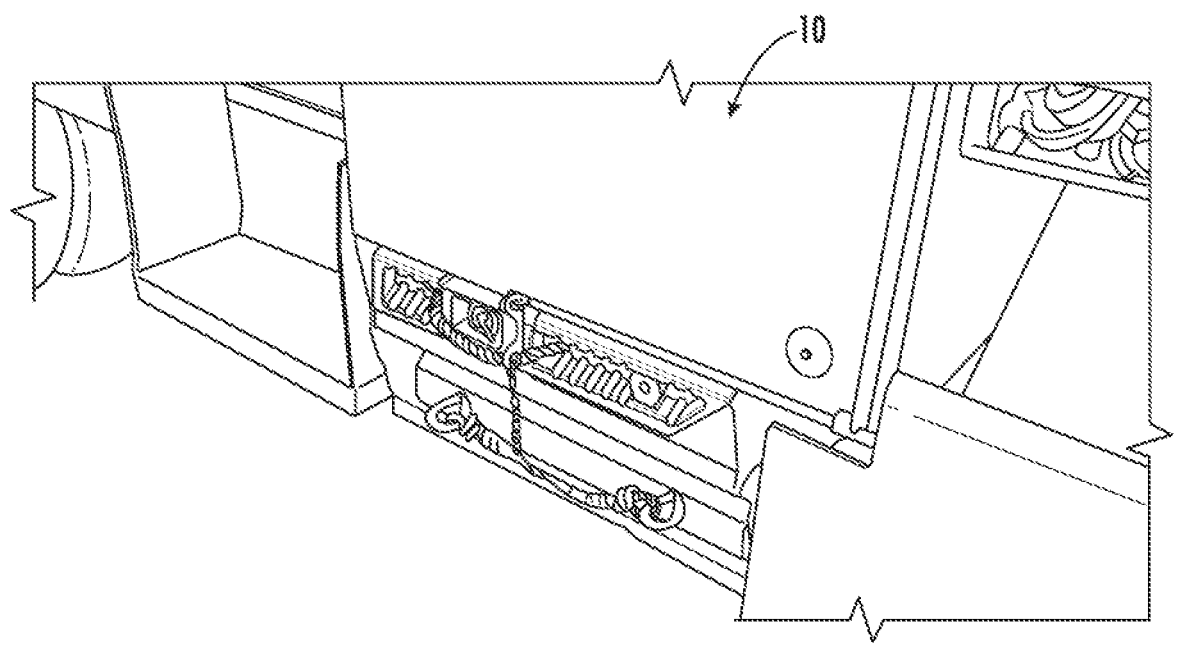
FIG. 7 shows the pole cradle of FIG. 1 stored in a utility truck.
Figure 8:
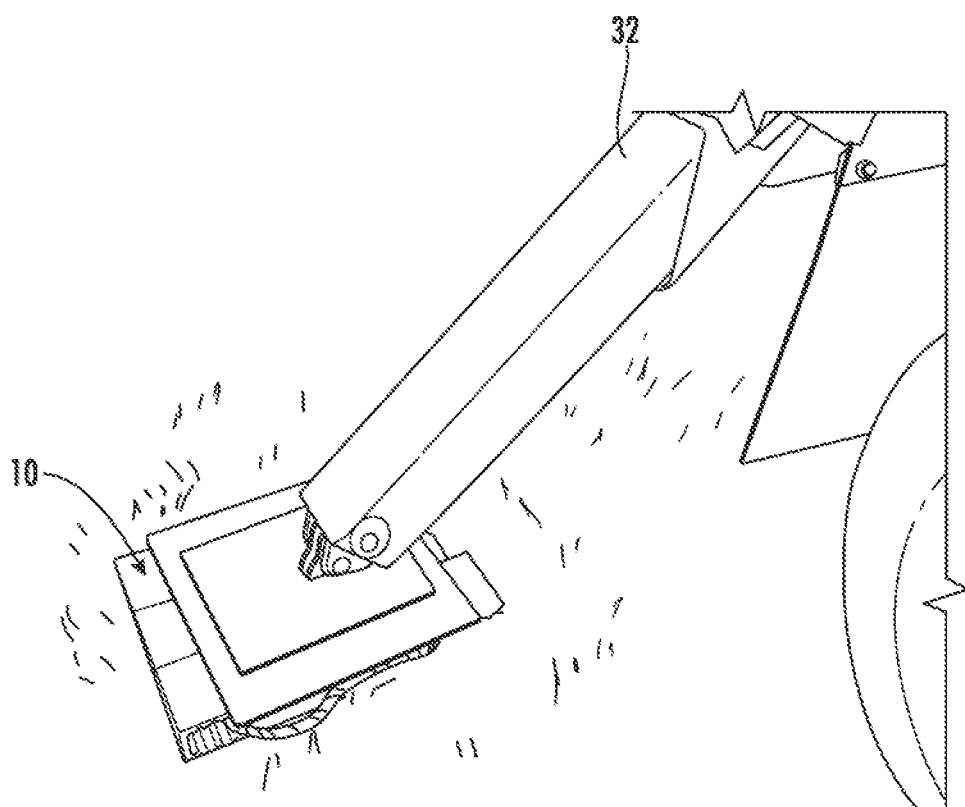
FIG. 8 shows the pole cradle of FIG. 1 being used as a stiff leg pad.

With the pole cradle 10 in the stored position, it may be stored in a utility truck, FIG. 7, for storage and transportation to a job or used to provide a solid surface and/or pad when leveling the utility truck so a boom and/or bucket can be extended from the utility truck. As illustrated in FIG. 8, the pole cradle 10 can be placed on the ground to provide a pad. A stiff leg 32 of the utility truck can then be lowered onto the pole cradle 10. The pole cradle 10 allows the stiff leg 32 to push against the pole cradle 10 and allow the utility truck to be lifted. This arrangement prevents the stiff leg 32 from sinking into the ground, thereby causing an unsafe condition.

The foregoing has described a pole cradle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A pole cradle, comprising:
   a first leg;
   a second leg;
   a third leg positioned between and pivotally connected to the first and second legs by a pivot connector extending through the first, second, and third legs, wherein the third leg pivots relative to the first and second legs between a first position and a second position;
   a pin, the pin locking the third leg with the first and second legs in the first position; and
   a support connector extending between the first and second legs, the support connector providing a stop for the third leg such that in the second position, the third leg abuts against the support connector.

2. The pole cradle according to claim 1, wherein each of the first, second, and third legs include a chamfered end to provide a flat support surface when in the second position.

3. The pole cradle according to claim 1, wherein the pivot connector extends through the first, second, and third legs at a position between about one-half a length "L" and about three-quarter the length "L".

4. The pole cradle according to claim 1, wherein each of the first, second, and third legs include an upper support portion and a lower support portion, the upper support portion including a V-shaped receiving section.

5. The pole cradle according to claim 2, wherein lower support portion includes the chamfered end.

6. The pole cradle according to claim 1, wherein the support connector connects the first and second legs together.

7. The pole cradle according to claim 6, wherein when the third leg abuts against the support connector, the third leg extends in a direction opposite the first and second legs.

8. A pole cradle, comprising:
   a first leg;
   a second leg;
   a third leg positioned between and pivotally connected to the first and second legs, wherein the third leg pivots relative to the first and second legs between a first position and a second position, wherein in the first position, the first, second, and third legs lie in plane to form a flat surface and in the second position, the first, second, and third legs form a V-shaped receiving section; and
   wherein each of the first, second, and third legs include a chamfered end to provide a flat support surface when in the second position.

9. The pole cradle according to claim 8, wherein the third leg is pivotally connected to the first and second legs by a pivot connector extending through the first, second, and third legs.

10. A pole cradle, comprising:
    first and second spaced-apart legs;
    a third leg positioned between and pivotally connected to the first and second spaced-apart legs, wherein the third leg pivots relative to the first and second legs between a first position and a second position;
    a spring pin biased in a locked position, the pin locking the third leg in the first position where the third leg is in plane with the first and second spaced-apart legs; and
    a stop connected to at least one of the first and second legs, the third leg abutting against the stop in the second position.

11. The pole cradle according to claim 10, wherein a connector extends through the first, second, and third legs at a position between about one-half a length "L" and about three-quarter the length "L".

12. The pole cradle according to claim 11, wherein the connector extends through the first, second, and third legs to pivotally connect the third leg between the first and second legs.

13. The pole cradle according to claim 10, wherein the third leg abuts against the stop and extends in a direction opposite the first and second legs.

14. The pole cradle according to claim 10, wherein in the second position, the pole cradle forms an X-shape.

* * * * *